United States Patent [19]

Schlage

[11] E Re. 31,276

[45] Reissued Jun. 14, 1983

[54] LOCK STRIKE CONSTRUCTION

[75] Inventor: Ernest L. Schlage, Burlingame, Calif.

[73] Assignee: Ingersoll-Rand Company, Woodcliff Lake, N.J.

[21] Appl. No.: 106,498

[22] Filed: Dec. 26, 1979

Related U.S. Patent Documents

Reissue of:

[64] Patent No.: 4,065,162
Issued: Dec. 27, 1977
Appl. No.: 724,929
Filed: Sep. 20, 1976

[51] Int. Cl.[3] ..... E05C 21/02

[52] U.S. Cl. ..... 292/340

[58] Field of Search ..... 292/341.18, 341.19, 292/340

[56] References Cited

U.S. PATENT DOCUMENTS

| | | | |
|---|---|---|---|
| 1,463,384 | 7/1923 | Butterworth | 292/341.18 |
| 2,127,891 | 8/1938 | Starling | 292/346 |
| 2,503,536 | 4/1950 | Yeakel | 292/341.18 |

*Primary Examiner*—Richard E. Moore
*Attorney, Agent, or Firm*—Walter C. Vliet

[57] ABSTRACT

A lock strike construction is for use with a wall having at least a cripple in the framing thereof and adjacent to a door casing side rail separated from the cripple by an intervening space. A door panel cooperates with the casing and has a lock with a bolt engageable with a strike on the door casing in a deeply recessed mortise. A planar elongated plate, symmetrical about a vertical axis, is in the mortise. An elongated bolt opening and a pair of screw clearance holes go through the planar plate on the axis. Also in the planar plate is a pair of screw rod holes, both disposed on one side of the axis. These receive a pair of screw rods extending through the intervening space and into the cripple as cantilever beams. The usual strike plate overlies the planar plate, its bolt opening registering with the bolt opening in the plate and its screw openings substantially registering with the screw clearance holes. Screw fasteners extend through the screw clearance holes in the strike plate and through the similar holes in the planar plate to engage the door casing side rail.

5 Claims, 3 Drawing Figures

FIG-1
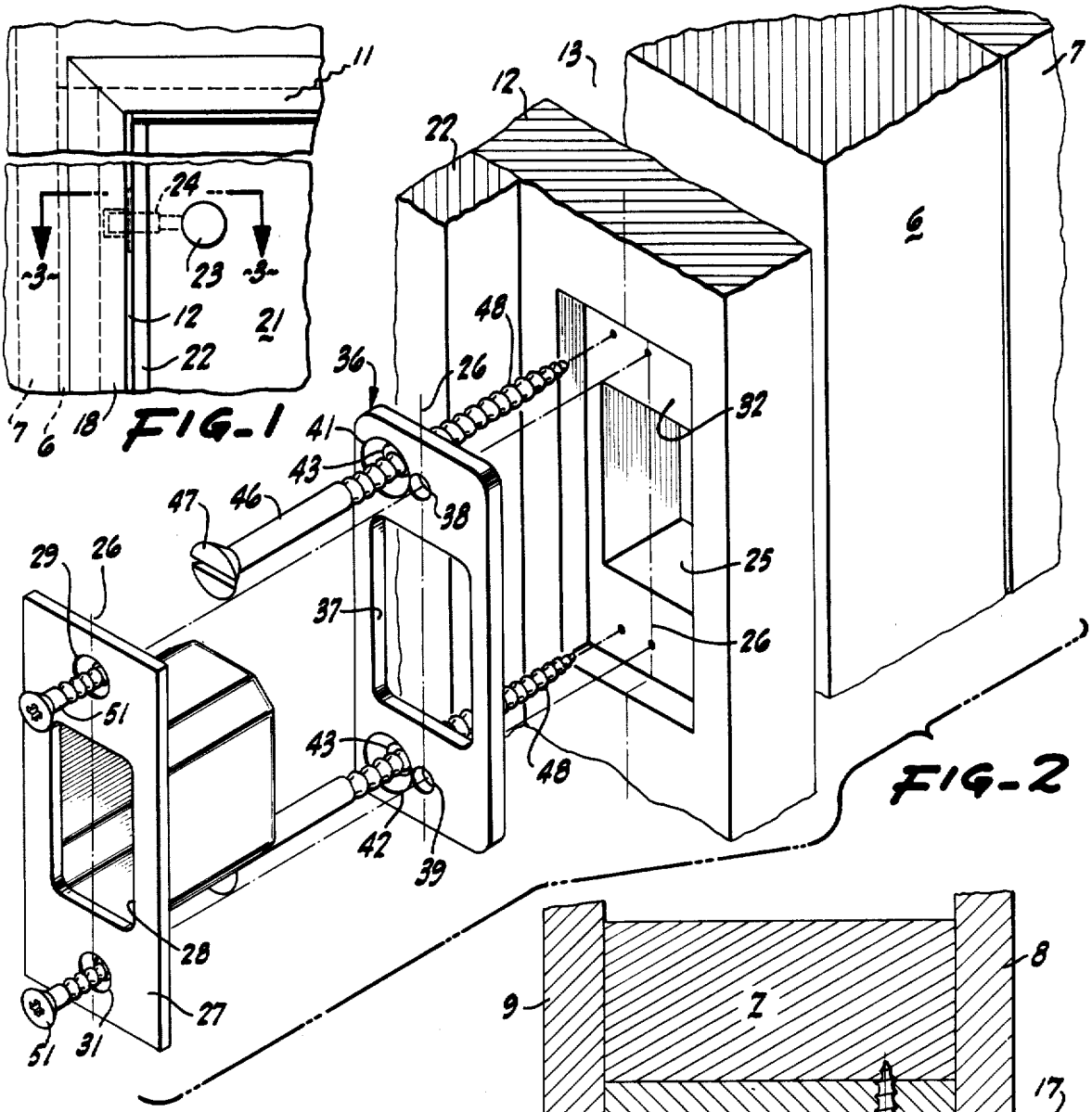
FIG-2
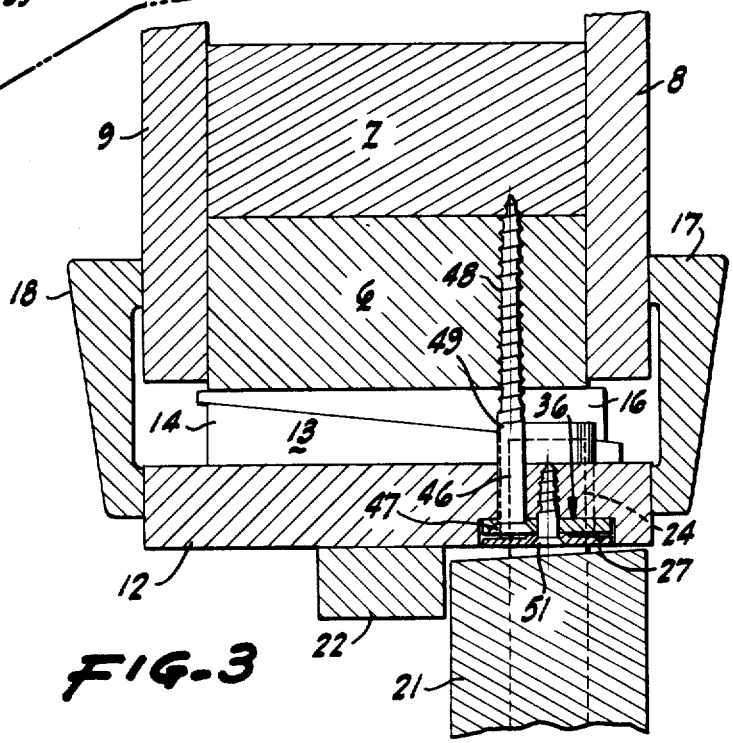
FIG-3

LOCK STRIKE CONSTRUCTION

Matter enclosed in heavy brackets [ ] appears in the original patent but forms no part of this reissue specification; matter printed in italics indicates the additions made by reissue.

CROSS-REFERENCE TO RELATED APPLICATIONS, IF ANY

Robert F. Murch application Ser. No. 622,738 filed Oct. 15, 1975, now U.S. Pat. No. 4,005,890 issued Feb. 1, 1977, and assigned to the assignee hereof.

BRIEF SUMMARY OF THE INVENTION

The lock strike construction is used with a wall having an upstanding cripple and other framing disposed alongside of but separated by a space from a door casing side rail. A door hinged on the casing seats against a stop on the casing and is equipped with a lock having a projecting bolt. A planar elongated plate is mounted in a mortise in the door casing and is secured to the cripple and adjacent framing by a pair of screw rods of substantial length and diameter. These extend through the planar plate and the door casing side rail and through the space into the cripple so as to act as cantilever beams resisting a lateral force against the door panel. The planar plate is recessed deeply enough in the mortise so as to accommodate an overlying standard strike plate held in by the usual fastening screws.

BRIEF DESCRIPTION OF THE SEVERAL VIEWS OF THE DRAWING

FIG. 1 is an elevation of a typical door panel and frame construction utilizing a lock strike construction pursuant to the invention, portions of the figure being broken away to reduce its size.

FIG. 2 is an isometric perspective showing in exploded form the lock strike construction of FIG. 1.

FIG. 3 is a cross-section, the plane of which is indicated in FIG. 1 by line 3—3.

DETAILED DESCRIPTION

In building construction, especially that comprised of wood framing and plaster or composition board wall surfaces, door installations are provided with lock mechanisms, including projecting deadbolts or latchbolts, received in strike plates or strike boxes installed in the door frame. Unfortunately, the strike installation is relatively weak since the strike mechanism is supported on the door casing side rail, customarily of relatively light wood. The door panel, even though locked, can be forced open without great difficulty by a kick or lunge against the door panel. This causes the projected bolt to move the strike plate horizontally with sufficient force to rupture the wood of the side rail.

This situation has been recognized for some time, and there have been various proposals for alleviating weakness in the latchbolt and strike area. Some of these incidentally afford additional strength. For example, U.S. Pat. No. 3,290,081 issued Dec. 6, 1966 to Sushan shows an arrangement in which relatively complex guards are provided with a number of bends, tabs and angles adapted to receive more than the normal number of fastening screws and serving primarily to prevent unauthorized latchbolt depression. U.S. Pat. No. 3,405,962 of Oct. 15, 1968, also to Sushan, shows a somewhat comparable arrangement in which elongated door reinforcement and strike plates are provided with a number of folds and extensions receiving additional fastening screws.

U.S. Pat. No. 3,767,245 of Oct. 23, 1973 to Keefe shows an arrangement in which a strike plate is enlarged and extended to lie between the door frame side rail and the door stop. The enlargement receives additional fastening screws.

U.S. Pat. No. 3,815,945 of June 11, 1974 to Lamphere discloses a specially milled side rail interlocked with an enlarged, configured and extended strike plate perforated to receive more than the customary number of fastening screws. The screws are long enough to penetrate into the wood construction immediately abutting the door casing side rail.

Also of interest, as noted above, is a pending application, assigned to the assignee hereof filed in the name of Robert F. Murch on Oct. 15, 1975 with Ser. No. 622,738. This shows a specially formed reinforcement member augmenting the otherwise standard construction.

While all of the foregoing devices are improvements in many ways over the customary construction, there has yet to appear an arrangement sufficiently effective, simple and easily installed as generally to be adopted.

It is therefore an object of the invention to provide a lock strike construction that is effective substantially to increase the resistance of a lock installation to dislodgement by kicking or a lateral blow.

Another object of the invention is to provide such a mechanism that easily can be utilized by customary workmen without substantial change in the usual, recognized technique for installation in the customary style of building construction.

Another object of the invention is to provide a lock strike construction that can be installed originally or even after a lock has initially been installed in order to increase its resistance to kick dislodgement.

A further object of the invention is in general to provide a lock strike construction that is sufficiently simple, economical and easily installed as to warrant its general adoption and use.

Another object of the invention is in general to provide a substantially improved lock strike construction.

While the foregoing objects can be attained in a number of different ways pursuant to the invention, they have been attained in the form of lock strike construction illustrated herein in a substantially standard environment.

In this arrangement there is provided as part of the framing of a building a cripple 6. This is a timber usually about the nominal 2 by 4 inches or 2 by 6 inches in cross-sectional dimensions extending in an upright fashion. The cripple is often augmented by a stud 7 of similar dimensions and disposed vertically immediately adjacent to and usually fastened to the cripple. There is provided a wall finish 8 and a comparable wall finish 9 on the opposite sides of the cripple and stud to define the exposed surfaces of the room.

Disposed alongside the cripple is a door frame 11 customarily of wood and including a particular side rail 12. This is a generally upright, flat rectangular wooden member perhaps one by 6 or one by 8 nominal inches. The rail is disposed with respect to the cripple 6 at a distance to afford an intervening space 13. While the space 13 does not always occur and may vary in size, it is usually present because the door opening is framed much larger than the door casing itself. This allows for the interposition of wedges 14 and 16 or shims so that the precisely made door frame can be accurately positioned both vertically and horizontally within the rough framing. It is customary to supplement the rail 12 with trim members 17 and 18 for finish purposes, but the members 17 and 18 are not expected to impart any particular strength to the construction.

Movable within the opening, partially framed by the side rail 12, is a door panel 21 mounted by hinges, usually, and movable toward and away from a door stop 22 extending vertically and fastened to the door frame side rail 12. The stop is centered so that the door panel 21 is offset to one side. In the door panel is disposed a lock mechanism 23 including a bolt 24, either a deadbolt or a latchbolt, movable between a retracted position substantially flush with the edge of the door panel and a projected position extending for approximately ¾ of an inch or 1 inch from the edge of the door panel.

It is customary to provide at least a mortise 25 in the side rail 12 deep enough for the reception of the bolt 24. Usually the bolt is rectangular and vertically elongated, and to accommodate it easily and to provide for vertical sag the mortise 25 is vertically extended and is symmetrical about a vertical axis 26. Such a mortise can be used alone but customarily has a rather shallow surrounding mortise to receive a thin strike plate 27. This plate has a central, vertically elongated opening 28 therein symmetrical with the vertical axis 26 about which the remainder of the plate is likewise symmetrical. The plate carries a pair of countersunk or beveled or conical screw holes 29 and 31 usually disposed on the axis 26 and above and below the opening 28. In some instances, simply the plate itself is utilized whereas in other instances a strike box or deep mortise liner is employed.

In fabricating the present arrangement the strike plate 27 is initially withheld, and the surrounding mortise 32 is made in the side rail 12 exactly as is customary except that it is made about twice or a litte more than twice the normal depth. This is easily accomplished with the customary tools by the customary workman or machine. The mortise 32 is usually a rectangular, vertically elongated depression symmetrical with the axis 26. While a deeper mortise removes more of the material of the side rail 12, the side rail is not substantially relied upon for strength in the present instance so that the removal of additional material is not of real consequence.

Pursuant to this invention there is disposed in the extra deep mortise 32 an elongated planar plate 36 usually of metal and rectangular in envelope configuration to correspond to the shape of the mortise 32. The plate 36 is itself symmetrical about the axis 26 and is provided symmetrically with a vertically elongated bolt opening 37 of the customary size to receive the bolt 24. If desired, the opening 37 can be slightly larger than customary in order to receive the relatively thin walls of an inserted strike box if such a strike box is to be employed. Included in the configuration of the planar plate 36 is a pair of screw clearance holes 38 and 39. These are both centered on the axis 26 and extend entirely through the plate 36. These holes are usually not beveled or conical but are circular-cylindrical and are of slightly greater diameter than the shanks of the customarily used fastening screws.

Particularly pursuant to this invention also, the plate 36 is additionally provided with a pair of screw rod holes 41 and 42 extending entirely therethrough. The holes 41 and 42 are not on the axis 26 but are both laterally displaced therefrom toward the same side, i.e. toward the center of the cripple 6, and are disposed above and below the opening 37. These holes are offset laterally because the door panel is customarily somewhat off center. The holes 41 and 42 are in position to overlie a portion of the cripple spaced from the cripple edge and affording a firm attachment site. The holes 41 and 42 are preferably conical or beveled so that the minor diameter 43 of each hole is considerably larger than the head of any screw that might be utilized as a fastener for the thin strike plate 27, as later described. This avoids misuse of small screws. The larger diameter of the holes 41 and 42 is great enough to receive the beveled or countersunk head of a screw rod 46 in flush fashion. The term "screw rod" is applied herein to a readily available fastener having a conical head 47 contoured to receive a tool, such as a screwdriver, and also having one or more helical, wood screw threads 48. These need not be but preferably are spaced from the head 47 to leave an interrupted, intervening section 49. This designation usually refers to a screw fastener at least three inches long in the customary, exemplary installation and of a diameter or size equivalent to at least number twelve or larger.

The rectangular, planar plate 36 is first installed against the bottom of the mortise 32, often press positioned. Screw rods 46 are then positioned through the holes 41 and 42 and go through the remainder of the side rail 12, span the space 13 and are substantially embedded in or encompassed by the material of the cripple 6 and often of the stud 7 also. If desired, a pilot hole is first drilled for each of the screw rods, but it is important that the threads of the screw rods be well embedded in the uprights after the screw rods span the intervening space 13. When the screw rods have been so installed and driven home the planar plate 36 is well positioned. Next, the thin strike plate 27 is installed over and in registry with the planar plate 36. The customary small screws 51 are inserted into the holes 29 and 31 and pass through the clearance openings 38 and 39 into the remaining material of the side rail 12. The installation is thus completed.

Externally, when the job has been finished, the appearance is no different than that of a customary installation, since only the strike plate 27 of customary form is exposed. There is no alteration in the operation of the bolt 24 with respect to the strike plate 27 or with respect to any strike box that may be utilized therewith. The fabrication, installation and finishing of the usual parts of the structure are not changed at all, the only exception being that there is a deeper mortise 32 than usual, pilot holes may be drilled for the screw rods 46, and the screw rods themselves are applied.

With this construction tests have indicated a substantial improvement in lateral strength.

The tests referred to are pursuant to a "Law Enforcement Standards Program" promulgated by the U.S. Department of Justice and published as "A Voluntary National Standard Promulgated by the National Institute of Law Enforcement and Criminal Justice," published December, 1975 and setting forth a "NILECJ standard for the physical security of door assemblies and components." The test is made with a framing structure having a door incorporated therein and closed and locked all according to detailed specifications. The door panel is impacted by a sort of battering ram including a specially suspended pendulum weight movable to a prescribed height and released to afford the desired impact upon the door panel. The test is divided into four classes. Class I involves two impacts of 80 Joules each. Class II involves the two blows of Class I plus two more blows of 120 Joules each. Class III involves the four blows of the two preceding classes plus two more blows of 160 Joules each, and Class IV includes the six blows according to the preceding classes plus two more blows of 200 Joules each.

In actual tests of the aforementioned sort, a standard strike mounting in customary grade of lumber and installed with high-grade workmanship and considerable care nevertheless failed to withstand even the initial blow of the released ram (80 Joules—Class I). In installations made pursuant to the present disclosure, the lock strike construction was able to withstand the maximum impacts provided by the ram, pursuant to the mentioned standards, with only occasional failures just below the maximum of Class IV. When the installation held, the wood portions were only partially disrupted, attendant upon a lateral or horizontal bending of the screw rods. Since the screw rods had free or unconfined or unsupported portions spanning the space between the cripple and the frame, they were able to absorb some of the impact energy by bending largely according to the bending mode of cantilever beams. The energy transferred into bending of the screw rods avoided, in practically all instances, major disruption of the strike or opening of the door even by the maximum test impact. In this instance the screw rods, although firmly anchored or mounted, by bending, cushioned some of the sharp impact from the adjacent wood construction and prevented undue shattering or splintering thereof. While in practice uniform results cannot always be attained because of variables such as the character of the wood, the grade of workmanship, the operational history of the installation and the like, there is nevertheless a manifold improvement in the security of the arrangement, especially as to the strike, over and above previous regular commercial practice. Furthermore, this is accomplished without any change from accepted, customary appearance, without requiring unusual expertise in workmanship, without requiring exotic tooling and with only elementary additional instructions to the installer. The mechanism is easily and economically produced in quantity in regular high-production manufacture and adds only a little in material and weight so it can be included in the regular lock or strike package.

I claim:

1. A lock strike construction for use with a wall having an upright structural cripple and an upright door casing side rail parallel to and separated from said cripple by an intervening space comprising an elongated planar plate having a longitudinal axis, means defining an elongated bolt opening [entirely enclosed] in said planar plate and extending along and substantially symmetrical with said axis, means forming a pair of screw-receiving circular holes in said planar plate on said axis and on opposite ends of said bolt opening, means forming a pair of screw rod holes in said planar plate both on one side of said axis and on opposite ends of said bolt opening, a pair of screw rods in said screw rod holes and extending through said side rail and through said space and into said cripple, *said planar plate including means on the door-opening side thereof forming a continuous web between said screw rod holes toward the direction of door opening,* a strike plate abutting said planar plate and said screw rods and in substantial registry with said planar plate, means defining a bolt opening and screw openings in said strike plate substantially registering with said elongated bolt opening and said screw receiving holes, and screw fasteners disposed in said screw receiving holes in said strike plate freely passing through said screw receiving circular holes in said planar plate and laterally engagable by both said strike plate and said planar plate.

2. A construction as in claim 1 in which said screw openings in said strike plate are conical and have a predetermined large diameter and in which said screw rod holes in said planar plate are conical and have a predetermined minimum diameter greater than said predetermined large diameter.

3. A construction as in claim 1 in which said strike plate is solid all around said bolt opening therein and in portions adapted to overlie and register with said screw rod holes in said planar plate and in which said planar plate is solid all around said bolt opening therein.

4. A construction as in claim 1 in which said planar plate and said strike plate are substantially congruent as to the peripheries thereof and as to said bolt openings.

5. A construction as in claim 1 in which said screw rods are for the most part engaged with said cripple and extend therefrom across said space and through said side rail and said planar plate as cantilever beams.

* * * * *